US010354223B2

(12) United States Patent
Clark et al.

(10) Patent No.: US 10,354,223 B2
(45) Date of Patent: Jul. 16, 2019

(54) SYSTEMS, DEVICES, AND METHODS FOR MACHINE READING

(71) Applicant: Walmart Apollo, LLC, Bentonville, AR (US)

(72) Inventors: Jimmie Russell Clark, Fayetteville, AR (US); Christopher Soames Johnson, Pea Ridge, AR (US); William Ross Allen, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/238,217

(22) Filed: Jan. 2, 2019

(65) Prior Publication Data

US 2019/0138980 A1    May 9, 2019

Related U.S. Application Data

(63) Continuation of application No. 15/428,802, filed on Feb. 9, 2017, now Pat. No. 10,204,314.

(60) Provisional application No. 62/293,010, filed on Feb. 9, 2019.

(51) Int. Cl.
*G06Q 10/08* (2012.01)
(52) U.S. Cl.
CPC ................ *G06Q 10/087* (2013.01)
(58) Field of Classification Search
USPC .................................................... 235/472.01
See application file for complete search history.

(56) References Cited

U.S. PATENT DOCUMENTS

| 7,520,433 B2 * | 4/2009 | Knowles | G06K 7/10693 235/462.32 |
| 2004/0199427 A1 * | 10/2004 | van der Loo | A47F 9/047 705/16 |
| 2008/0173714 A1 * | 7/2008 | Kite | B07C 3/00 235/386 |

(Continued)

FOREIGN PATENT DOCUMENTS

WO    2005084227 A2    9/2005

OTHER PUBLICATIONS

U.S. Appl. No. 15/428,802, filed Feb. 9, 2017, Jimmie Russell Clark et al.

*Primary Examiner* — Michael G Lee
*Assistant Examiner* — David Tardif
(74) *Attorney, Agent, or Firm* — McCarter & English, LLP; David R. Burns

(57) ABSTRACT

Methodologies, systems, and computer-readable media are provided for reading machine readable features of objects. A local terminal generates a temporary object number corresponding to an unreadable object and captures an image of the unreadable object. A message is sent to a number of portable devices requesting that a duplicate of the unreadable object be located and that a machine readable feature on the duplicate object be read. Once a duplicate object is located, one of the portable devices reads a machine readable feature on the duplicate object, and the portable device calls a service offered by a server to retrieve a data value corresponding to the duplicate item from a database. This data value is then sent to the local terminal invoking a service offered by the terminal to replace the temporary object number with the data value corresponding to the duplicate item.

21 Claims, 5 Drawing Sheets

(56) References Cited

U.S. PATENT DOCUMENTS

| | | |
|---|---|---|
| 2009/0060259 A1 | 3/2009 | Goncalves |
| 2013/0134213 A1 | 5/2013 | Pallakoff et al. |
| 2013/0175339 A1* | 7/2013 | Svetal .................... G06Q 30/06 235/383 |
| 2014/0129362 A1* | 5/2014 | Marquis ............... G07G 1/0036 705/23 |
| 2014/0214596 A1* | 7/2014 | Acker, Jr. .......... G06Q 30/0633 705/26.8 |
| 2015/0018682 A1 | 1/2015 | Schers et al. |

* cited by examiner

SYSTEMS, DEVICES, AND METHODS FOR MACHINE READING

RELATED APPLICATIONS

This application is a continuation application of U.S. patent application Ser. No. 15/428,802 entitled "SYSTEMS, DEVICES, AND METHODS FOR MACHINE READING," filed on Feb. 9, 2017 which claims priority to Provisional Patent Application No. 62/293,010 entitled "SYSTEMS, DEVICES, AND METHODS FOR MACHINE READING," filed on Feb. 9, 2016, the contents of both applications are hereby incorporated by reference in their entirety.

BACKGROUND OF THE TECHNOLOGY

Physical objects can be associated with machine-readable identifiers that can be read by an optical reader. In some instances, the machine-readable identifier may not be available for a particular object or may be damaged or unreadable.

SUMMARY

In accordance with embodiments of the present disclosure, a machine reading system is disclosed. The system includes a terminal in communication with a server via a first communication channel, the terminal including an optical reader and an image capturing device. The terminal is configured to generate a reference number corresponding to a selection of objects to be read by the optical reader. The terminal is also configured to generate a temporary object number corresponding to an unreadable object included in the selection of objects, the unreadable object incapable of being read by the optical reader. The terminal is also configured to capture an image of the unreadable object via the image capturing device. The terminal is also configured to transmit a first message to the server in response to identifying an unreadable object, the first message including the reference number, the temporary object number, and the image of the unreadable object. The system also includes a server in communication with a plurality of portable electronic devices via a second communication channel. The server is configured to transmit a second message to the plurality of portable electronic devices, the second message including the temporary object number, the image of the unreadable object, and a request to locate a duplicate of the unreadable object based on the captured image and read a machine readable feature of the duplicate object. The system also includes a plurality of portable electronic devices configured to receive the second message, and in response to a first of the plurality of portable electronic devices reading a machine readable feature of the duplicate object, call a first service offered by the server to retrieve a first data value corresponding to the duplicate object from a database and associate the first data value with the temporary object number. The terminal is also configured to allow continued reading of machine readable features of additional objects from the selection of objects while the duplicate object is being located and before the machine readable feature of the duplicate object is read, and the server is further configured to transmit a third message to the terminal, the third message including the first data value associated with the temporary object number that invokes a second service offered by the terminal to replace the temporary object number with the first data value.

Additional combinations or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
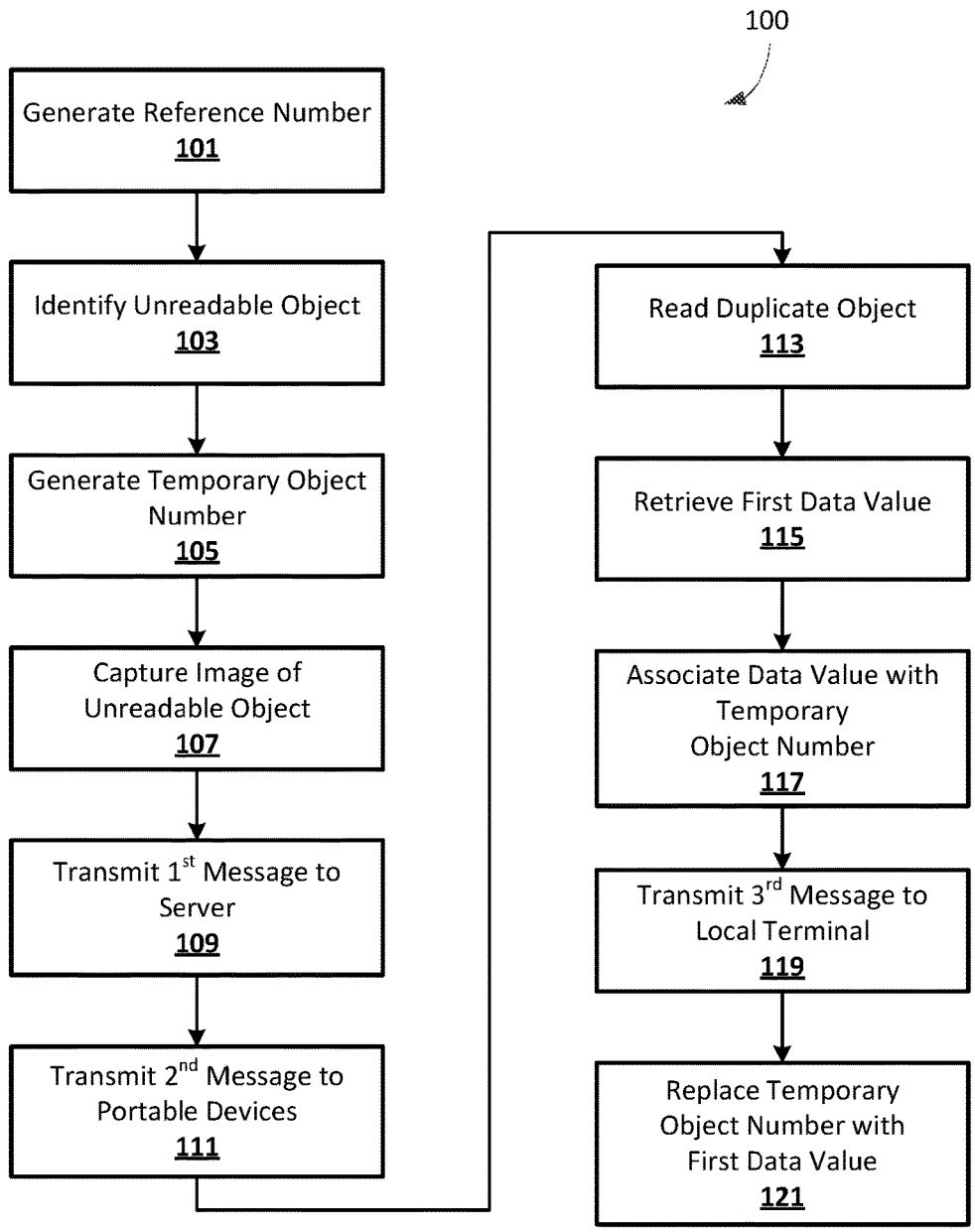
FIG. 1 is a flowchart illustrating an exemplary method of distributed reading of machine readable features on objects.

Following below are more detailed descriptions of various concepts related to, and embodiments of, inventive methods, apparatus, and systems for machine reading. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate distributed reading of machine readable features on objects.

Within an enterprise, a user at a local terminal is responsible for reading encoded machine readable features, such as barcodes or QR codes, associated with objects brought to the local terminal. Each object read is assigned a unique object number by the local terminal, and a unique group reference number is generated and assigned to each set or group of objects brought to the local terminal. At times, the local terminal is unable scan certain objects because the machine readable feature is missing, damaged, or otherwise unreadable by local terminal. In such instances, the user typically can pause the scanning process and perform a lookup process. At times, the lookup process requires that another user locate and retrieve a duplicate object that includes a duplicate machine readable feature so that the user can scan the duplicate machine-readable feature on the duplicate object in order to assign the correct object number to the object having the unreadable machine-readable feature. Once this process is completed, the user can continue scanning additional objects in the set. During the lookup process, however, the scanning of additional items often has to be put on hold delaying completion of the scanning of the machine-readable features of each object in the group.

In accordance with some embodiments of the present disclosure, a machine reading system is disclosed that facilitates distributed reading of machine readable features on objects. In some embodiments, once a user at a local terminal has attempted to scan a machine readable feature on an object that is missing or incapable of being scanned or read by the local terminal, the local terminal generates a temporary object number that corresponds to the object with the missing or unreadable machine-readable identifier. The temporary object number is added to a list of scanned objects from the set or group, which is associated with the reference number assigned to that set or group. The local terminal includes a camera or other image capturing device to capture an image of the object with the missing or unreadable machine-readable feature. Once the image is captured, the local terminal can transmit a first message to a server that includes the group reference number, the temporary object number, and the image of the object with the missing or unreadable machine-readable feature.

The server can transmit a second message to a number of portable electronic devices requesting that a duplicate of the object with the missing or unreadable machine-readable feature be located and scanned in situ (i.e., where the duplicate object is found and remotely from the local terminal). The second message can include the temporary object number and the image of the unreadable object so that a user of one of the portable electronic devices can locate a duplicate object based on the image of the unreadable object. Once a duplicate object has been located, the portable electronic device can read or scan a machine readable feature, such as a barcode or QR code, on the duplicate object.

Once the machine readable feature on the duplicate object has been read, the portable electronic device can call a first service offered by the server to retrieve a data value corresponding to the duplicate object from a database. This data value can include attributes and/or information relating to the duplicate item. The server can then generate and send a third message to the local terminal invoking a service offered by the local terminal to replace the temporary object number with the data value corresponding to the duplicate item. Throughout this process, while the duplicate object is being located and scanned in situ, and it's corresponding data value is being retrieved from a database, the local terminal can continue scanning objects and adding those objects to the list of scanned objects from the set or group.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary method 100 for distributed reading of machine readable features on objects. It will be appreciated that the method is programmatically performed by one or more computer-executable processes executing on, or in communication with the server described further below. In step 101, a reference number module of a local terminal generates a unique reference number corresponding to a selection of objects (a group or set of objects) to be read by an optical reader of the local terminal. The objects in the set or group have been removed from their locations and brought to the local terminal. The reference number identifies one set or group of objects to be scanned from another set or group of objects to be scanned. The local terminal can include, for example, a terminal or kiosk associated with a checkout station within an enterprise.

In step 103, an unreadable object identification module of the local terminal identifies an object with a missing or unreadable encoded machine-readable feature, which is referred to herein as an unreadable object. Examples of encoded machine readable features can include, for example, a barcode or QR code, and the optical reader can include a barcode reader, QR code reader, or any other suitable user-machine interface device regardless of mobility or form factor. In some embodiments, an unreadable object may be identified automatically if the local terminal unsuccessfully attempts to read an object a certain number of times. In other embodiments, an unreadable object may be identified by a user of the local terminal, and the user may provide an input to the local terminal indicating that the object is unreadable.

In step 105, a temporary object number generator module of the local terminal generates a temporary object number corresponding to an unreadable object and inserts the temporary object number in the list of scanned objects for the set or group of objects. The temporary object number serves as a place holder on the list so that subsequent items may be scanned and added to the list.

In step 107, an image of the unreadable item is captured by a camera or image capturing device at the local terminal. The image can be used to assist in identifying the unreadable object and locating a duplicate object that can be scanned in its place. In some embodiments, the user of the local terminal can add additional information about the unreadable object in order to assist in locating a duplicate object. For example, the user can add a brief description of the object or add the department/location from which the object likely originated.

In step 109, a first communication module of the local terminal generates and transmits a first message to a server via a first communication channel. The first message includes, for example, the reference number generated in step 101 and the image of the unreadable object captured in step 107. Once the first message has been sent requesting that a duplicate item be located and scanned, the user of the local terminal can continue scanning objects in the set or group of objects. Scanning is not put on hold, because the temporary object number acts as a placeholder in the list.

In step 111, the server, via a second communication module module, generates and transmits a second message to a number of portable electronic devices (disposed remotely from the local terminal and the server). In some embodiments, the portable electronic devices can communicate with the server over a second communication channel. The portable electronic devices can include a scanning device or optical reader similar to the optical readers associated with the local terminals, or some other type scanner capable of reading machine readable features on objects. The second message includes, for example, the temporary object number generated in step 105, the image of the unreadable object captured in step 107, and a request to locate a duplicate of the unreadable object based on the captured image and read a machine readable feature of the duplicate object. If the original department/location of the unreadable object has been provided by the user of the local terminal, the second message sent out to the portable electronic devices can be sent to portable electronic devices associated with users assigned to be in that department/location, or an additional alert can be sent out to that department/location with the intention of finding users who are relatively close to a duplicate object.

The portable electronic devices can also display one or more tasks that are available to be performed, and users of the portable electronic devices can interact with them in order to select tasks for completion, indicate which tasks they are currently performing, or indicate which tasks have been completed. In some embodiments, if a user of one of the portable electronic devices can identify from which department/location the unreadable object originated, the user can mark the correct department/location at which the duplicate object can be found and an alert may be sent to portable electronic devices associated with user assigned to be in that department/location. In other embodiments, if a user of one of the portable electronic devices decides to begin the task of locating the duplicate item, the user can provide an input to their portable electronic device indicating that they have begun searching for the duplicate object. In such cases, once one user has indicated that they have begun the task of locating the duplicate item, the task can be removed from the rest of the portable electronic devices. If the user who began the task is subsequently unable to locate the duplicate item, the user can push the task back into the queue of tasks available to users on their portable electronic devices.

In step 113, a machine reading module of one of the portable electronic devices reads a machine readable feature on a duplicate of the unreadable object in situ once the duplicate object has been located. Reading the machine readable feature on the duplicate object causes the portable electronic device to call a first service offered by the server. The first service is executed by the server to cause the server to retrieve a first data value corresponding to the duplicate object from a database in step 115, and associate or match the first data value with the temporary object number in step 117. The first data value can include identification and attributes or parameter information relating to the duplicate item.

In step 119, the second communication module of the server transmits a third message to the local terminal. The third message includes, for example, the first data value retrieved from the database in step 115, and invokes a second service offered by the local terminal to replace the temporary object number with the first data value in step 121. Throughout this process, from when the temporary object number is generated in step 105 to when the temporary object number is replaced by the first data value in step 121, the local terminal can continue scanning objects and adding those objects to the list.

Figure 2:
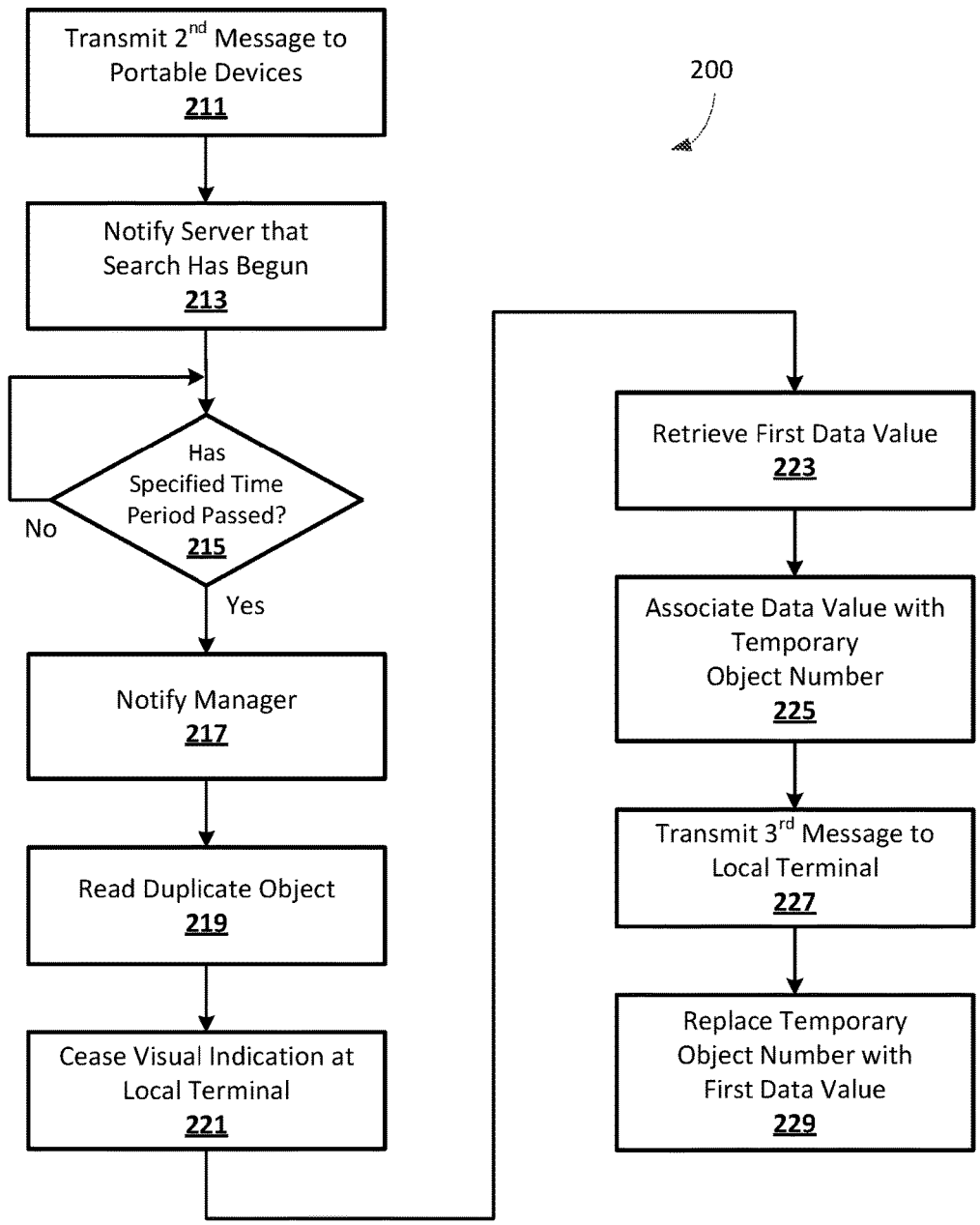
FIG. 2 is a flowchart illustrating another exemplary method of distributed reading of machine readable features on objects.

FIG. 2 is a flowchart illustrating another exemplary method 200 for distributed reading of machine readable features on objects. It will be appreciated that the method is programmatically performed by one or more computer-executable processes executing on, or in communication with the server described further below. In step 211, a second communication module of a server generates and transmits a second message to a number of portable electronic devices (disposed remotely from the local terminal and the server). In some embodiments, the portable electronic devices can communicate with the server over a second communication channel. The portable electronic devices can include a scanning device or optical reader similar to the optical readers associated with the local terminals, or some other type scanner capable of reading machine readable features on objects. Until step 211, the method proceeds as described above in reference to steps 101 through 109 of FIG. 1. The second message includes, for example, the temporary object number generated in step 105, the image of the unreadable object captured in step 107, and a request to locate a duplicate of the unreadable object based on the captured image and read a machine readable feature of the duplicate object. If the original department/location of the unreadable object has been provided by the user of the local terminal, the second message sent out to the portable electronic devices can be sent to portable electronic devices associated with users assigned to be in that department/location, or an additional alert can be sent out to that department/location with the intention of finding users who are relatively close to a duplicate object. While a duplicate item is being located and scanned, the user of the local terminal can continue scanning objects and adding those objects to a list of scanned objects. Scanning is not put on hold, because the temporary object number acts as a placeholder in the list.

In step 213, one of the portable electronic devices transmits a notification to the server that the search for the duplicate object has begun. As described above, the second message is transmitted in step 211 to a number of portable electronic devices, which can provide a notification to users of the portable electronic devices that a duplicate item needs to be located. In some embodiments, if user of one of the portable electronic devices decides to take on the task of locating the duplicate item, they can provide an input on their respective portable electronic device notifying the server that they have begun searching for the duplicate object. The server can then transmit a fourth message to the local terminal including a notification that the duplicate product is being located. A visual indication at the local terminal can also be provided so that the user at the local terminal can know whether someone has begun searching for the duplicate item.

In some embodiments, if too much time has passed and the duplicate object has not been located and scanned, a manager can be notified. In step 215, a delay tracking module of the local terminal determines whether a specified period of time has passed. If the specified period of time has passed, a notification can be sent in step 217 to notify a manager that the machine readable feature of the duplicate object has not been read. In some embodiments, the notification can be transmitted to a manager terminal or an electronic device used by one or more of the managers. In other embodiments, continuous notifications can be provided to the manager terminal or an electronic device used by a manager in order to provide updates related to the status of a price checking task from start to finish.

In step 219, one of the portable electronic devices reads a machine readable feature on a duplicate of the unreadable object once the duplicate object has been located. In step 221, the terminal can cease providing the visual indication at the local terminal, thus indicating to the user of the local terminal that the duplicate item has been scanned. In other embodiments, the local terminal can provide additional notification, such as an alert on a display device associated with the local terminal or an audio notification, in order to communicate to a user of the local terminal that the duplicate item has been successfully scanned and that price check task is complete.

Reading the machine readable feature on the duplicate object causes the portable electronic device to call a first service offered by the server. This first service causes the server to retrieve a first data value corresponding to the duplicate object from a database in step 223, and associate or match the first data value with the temporary object number in step 225. The first data value can include identification and price information relating to the duplicate item, in some embodiments.

In step 227, the second communication module of the server transmits a third message to the local terminal. The third message includes the first data value retrieved from the database in step 223, and invokes a second service offered by the local terminal to replace the temporary object number with the first data value in step 229. Throughout this process, from when the temporary object number is generated to when the temporary object number is replaced by the first data value, the user at the local terminal can continue reading machine readable features on additional objects.

Figure 3:
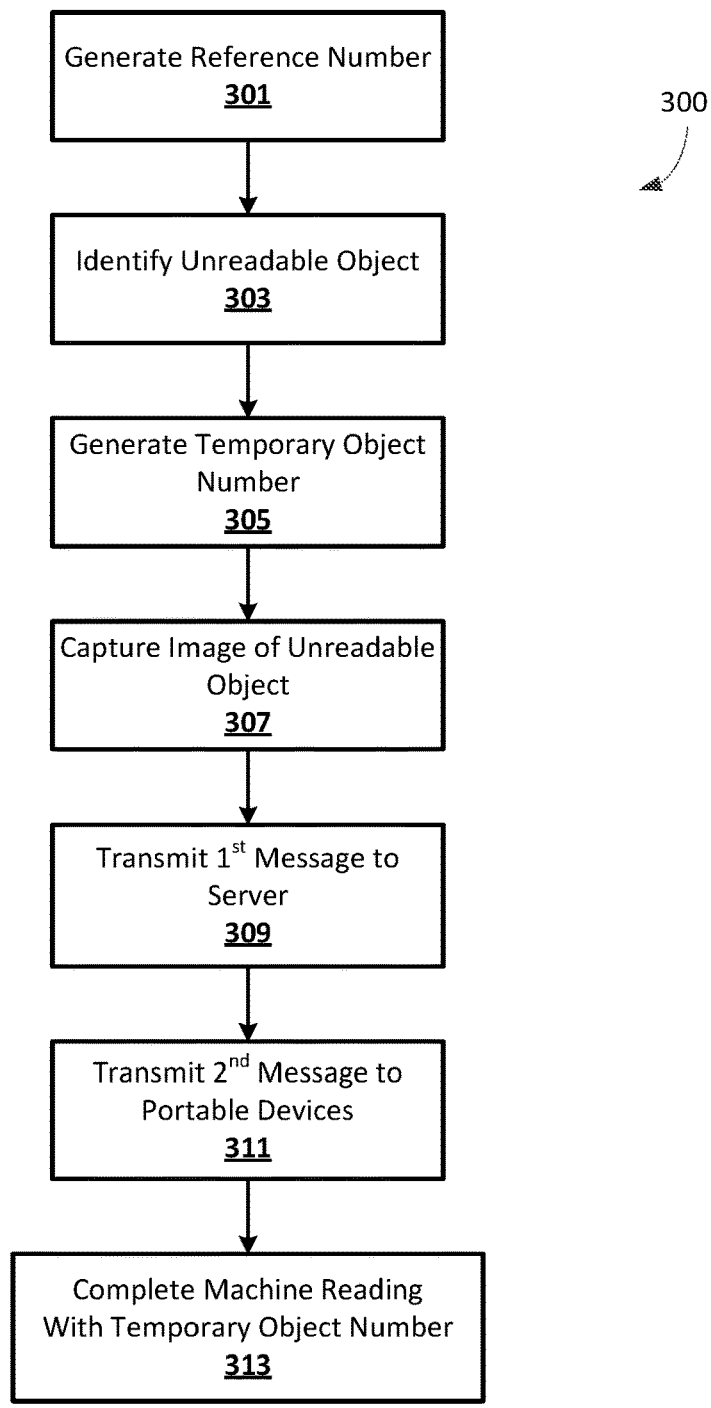
FIG. 3 is a flowchart illustrating another exemplary method of distributed reading of machine readable features on objects.

FIG. 3 is a flowchart illustrating another exemplary method 300 for distributed reading of machine readable features on objects. It will be appreciated that the method is programmatically performed by one or more computer-executable processes executing on, or in communication with the server described further below. In step 301, a reference number module of a local terminal generates a unique reference number corresponding to a selection of objects (a group or set of objects) to be read by an optical reader of the local terminal. The objects in the set or group have been removed from their locations and brought to the local terminal. The reference number identifies one set or group of objects to be scanned from another set or group of objects to be scanned. The local terminal can include, for example, a terminal or kiosk associated with a checkout station within an enterprise.

In step 303, an unreadable object identification module of the local terminal identifies an object with a missing or unreadable encoded machine-readable feature, which is referred to herein as an unreadable object. Examples of encoded machine readable features can include, for example, a barcode or QR code, and the optical reader can include a barcode reader, QR code reader, or any other suitable user-machine interface device regardless of mobility or form factor. In some embodiments, an unreadable object may be identified automatically if the local terminal unsuccessfully attempts to read an object a certain number of times. In other embodiments, an unreadable object may be identified by a user of the local terminal, and the user may provide an input to the local terminal indicating that the object is unreadable.

In step 305, a temporary object number generator module of the local terminal generates a temporary object number corresponding to an unreadable object and inserts the temporary object number in the list of scanned objects for the set or group of objects. The temporary object number serves as a place holder on the list so that subsequent items may be scanned and added to the list.

In step 307, an image of the unreadable item is captured by a camera or image capturing device at the local terminal. The image can be used to assist in identifying the unreadable object and locating a duplicate object that can be scanned in its place. In some embodiments, the user of the local terminal can add additional information about the unreadable object in order to assist in locating a duplicate object. For example, the user can add a brief description of the object or add the department/location from which the object likely originated.

In step 309, a first communication module of the local terminal generates and transmits a first message to a server via a first communication channel. The first message includes, for example, the reference number generated in step 301 and the image of the unreadable object captured in step 307. Once the first message has been sent requesting that a duplicate item be located and scanned, the user of the local terminal can continue scanning objects in the set or group of objects. Scanning is not put on hold, because the temporary object number acts as a placeholder in the list.

In step 311, a second communication module of the server generates and transmits a second message to a number of portable electronic devices (disposed remotely from the local terminal and the server). In some embodiments, the portable electronic devices can communicate with the server over a second communication channel. The portable electronic devices can include a scanning device or optical reader similar to the optical readers associated with the local terminals, or some other type scanner capable of reading machine readable features on objects. The second message includes, for example, the temporary object number generated in step 305, the image of the unreadable object captured in step 307, and a request to locate a duplicate of the unreadable object based on the captured image and read a machine readable feature of the duplicate object. If the original department/location of the unreadable object has been provided by the user of the local terminal, the second message sent out to the portable electronic devices can be sent to portable electronic devices associated with users assigned to be in that department/location, or an additional alert can be sent out to that department/location with the intention of finding users who are relatively close to a duplicate object.

In step 313, the machine reading process is completed at the local terminal. In this embodiment, if too much time has passed waiting for the duplicate item to be located and scanned, and if the rest of the objects to be scanned have been read, the user of the local terminal has the ability to complete the machine reading process before the terminal replaces the temporary object number with a retrieved data value. Because the local terminal generated a temporary object number for the unreadable object, there will be a record of the object on a report or receipt associated with the group of objects read.

Figure 4:
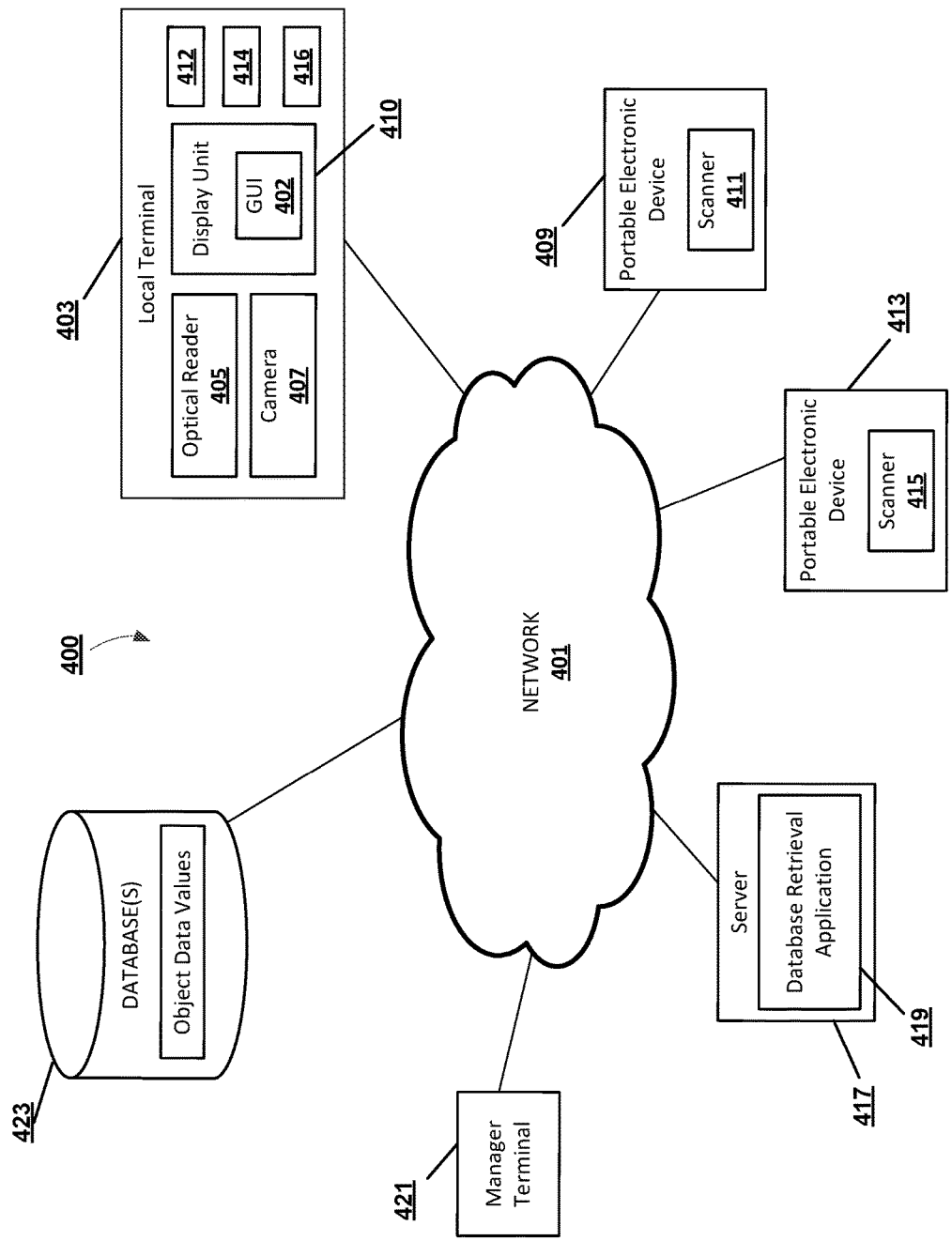
FIG. 4 is a diagram of an exemplary network environment suitable for a distributed implementation of an exemplary embodiment of the present disclosure.

FIG. 4 illustrates a network diagram depicting a system 400 suitable for a distributed implementation of exemplary embodiments. The system 400 can include a network 401, a local terminal 403, two or more portable electronic devices 409 and 413, a server 417, a manager terminal 421, and a database 423. As will be appreciated, various distributed or centralized configurations may be implemented, and in some embodiments a single server can be used. In exemplary embodiments, the server 417 can store one or more applications 419, which can implement one or more of the processes described herein, or portions thereof, with reference to FIGS. 1-3 and can include one or more of the modules described herein with reference to FIGS. 1-3 to implement the processes. For example, the one or more applications 419 can include code to be executed by the modules described herein to one or more processes of the present disclosure. The database 423 can store the object data values. The system can also include the manager terminal 421, which can receive and display updates regarding the status of a search.

The portable electronic devices 409 and 413 can include scanners or optical readers 411 and 415, respectively, that are configured to read encoded machine readable features on objects. The portable electronic devices 409 and 413 can also display one or more tasks that are available to be performed, and users can interact with the devices in order to select tasks for completion, indicate which tasks they are currently performing, or indicate which tasks have been completed. The portable electronic devices 409 and 413, the server 417, and the local terminal 403 can communicate with each other and with the database 423 to transmit and receive messages, perform database queries, and call the services described above.

In exemplary embodiments, the local terminal 403 may include a display unit 410, which can display a GUI 402 to a user of the local terminal such that the user can view visual indications regarding the status of the price check, as described above. In some embodiments, the local terminal 403 also includes an optical reader 405 for reading machine readable features on objects and a camera 407 for capturing images of unreadable objects, as described above. The terminal 403 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The terminal 403 may include some or all components described in relation to computing device 500 shown in FIG. 5.

As a non-limiting example application, the local terminal 403, can be part of a store infrastructure and aid in performing various transactions related to sales and other aspects of a store and the portable electronic devices 409 and 413 can be carried by individuals throughout the store. Being part of a store's infrastructure, the terminal 403 may be fixedly installed within the store or may be fixedly installed or operational outside of the store. In some embodiments, the terminal 403 may be a mobile device that can be used within the store, and is not physically installed or attached to one particular location within the store. The terminal 403 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like. The terminal 403 may connect to network 401 via a wired or wireless connection. The terminal 403 may include one or more applications such as, but not limited to, a web browser, a sales transaction application, an object reader application, and the like.

In exemplary embodiments, the servers 417 and 421, database 423, portable electronic devices 409 and 413, and local terminal 403 may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In one embodiment, the server 417, portable electronic devices 409 and 413, and the local terminal 403 can transmit instructions to each other over the communication network 401. In exemplary embodiments, the object data values and other data can be stored at database 423 and received at the server 417 in response to a service performed by the database retrieval application 419. For example, the local terminal 403 can be processing a transaction including a group or set of objects and can facilitate the processes described herein with reference, for example, to FIGS. 1-3 to facilitate identification of objects with missing or unreadable encoded machine-readable features remotely by the portable electronic devices 409 and 413. Advantageously, the user of the local terminal can continue to perform the transaction without waiting for the portable electronic devices to transmit the identification of the object.

Figure 5:
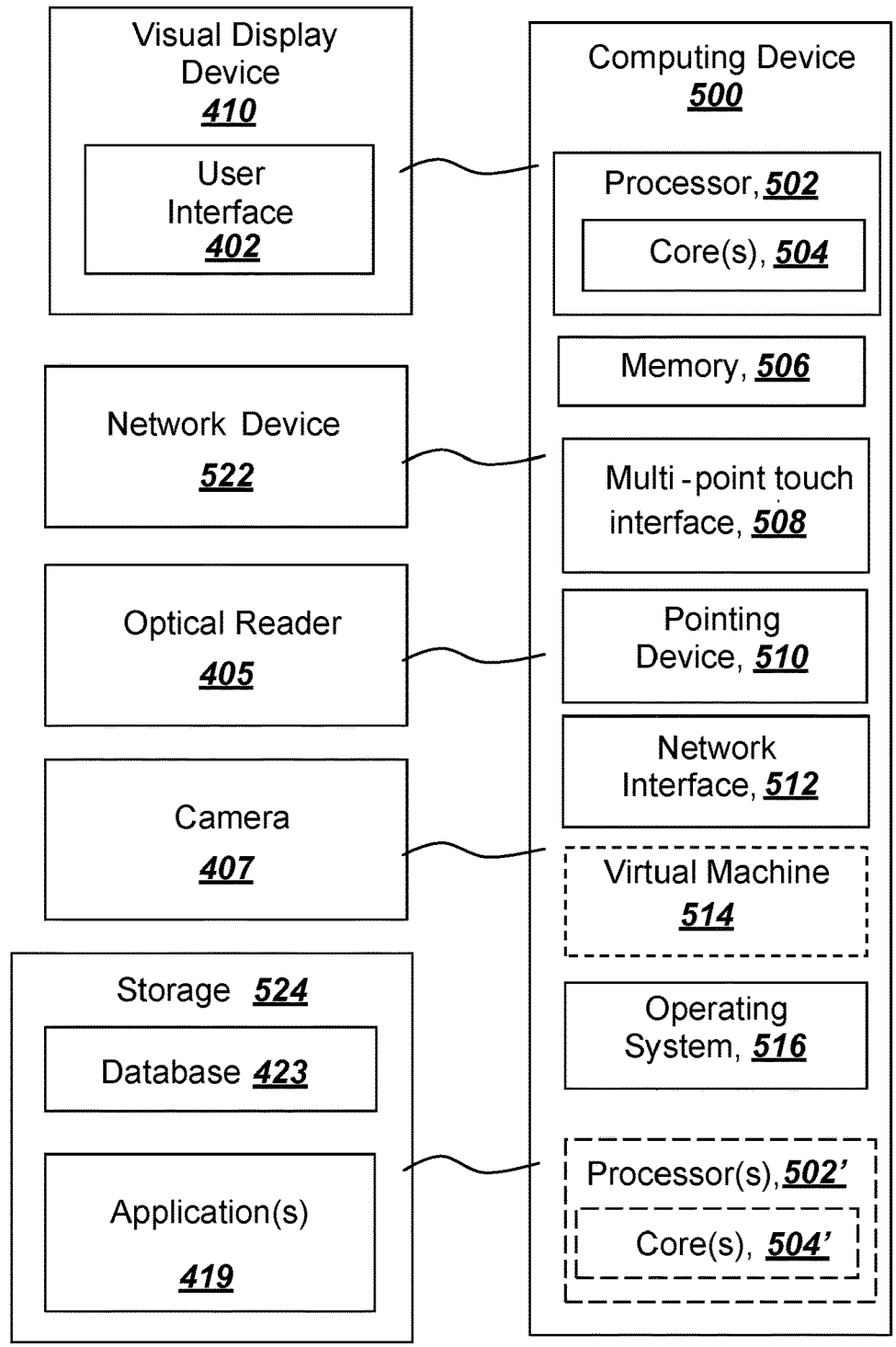
FIG. 5 is a block diagram of an exemplary computing device that can be used to perform exemplary processes in accordance with an exemplary embodiment of the present disclosure.

FIG. 5 is a block diagram of an exemplary computing device 500 that can be used in the performance of any of the example methods according to the principles described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 506 included in the computing device 500 can store computer-readable and computer-executable instructions or software for implementing exemplary embodiments and programmed to perform processes described above in reference to FIGS. 1-3. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a visual display device 410, such as a touch screen display or computer monitor, which can display one or more user interfaces 402 that can be provided in accordance with exemplary embodiments. The computing device 500 can include or be in communication with an optical reader 405, for reading machine readable features on objects, and a camera 407, for capturing images of unreadable objects, as described above. The computing device 500 can also include other I/O devices for receiving input from a user, for example, a keyboard or any suitable multi-point touch interface 508, a pointing device 510 (e.g., a pen, stylus, mouse, or trackpad). The keyboard 508 and the pointing device 510 can be coupled to the visual display device 410. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such as a database retrieval application 419 that can implement exemplary embodiments of the methods and systems as taught herein, or portions thereof. Exemplary storage device 524 can also store one or more databases 423 for storing any suitable information required to implement exemplary embodiments. The databases can be updated by a user or automatically at any suitable time to add, delete, or update one or more items in the databases. Exemplary storage device 524 can store one or more databases 423 for storing object data values and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A machine reading system comprising:
   (a) a terminal in communication with a server via a first communication channel, the terminal including an optical reader and an image capturing device and configured to:
      (i) generate a reference number corresponding to a selection of objects to be read by the optical reader;
      (ii) attempt to read using the optical reader an unreadable object;
      (iii) generate a temporary object number corresponding to the unreadable object included in the selection of objects, in response to the optical reader failing to read the unreadable object;
      (iv) capture an image of the unreadable object via the image capturing device; and
      (v) transmit a first message to the server in response to identifying an unreadable object, the first message including the reference number, the temporary object number, and the image of the unreadable object;
   (b) the plurality of portable electronic devices configured to receive the second message from the server including a request to locate a duplicate of the unreadable object based on the captured image and read a machine readable feature of the duplicate object, and in response to a first of the plurality of portable electronic devices reading a machine readable feature of the duplicate object, call a first service offered by the server to retrieve a first data value corresponding to the duplicate object from a database and associate the first data value with the temporary object number; and
   (c) wherein the terminal is further configured to allow continued reading of machine readable features of additional objects from the selection of objects while the duplicate object is being located and before the machine readable feature of the duplicate object is read, and the server is further configured to transmit a third message to the terminal, the third message including the first data value associated with the temporary object number that invokes a second service offered by the terminal to replace the temporary object number with the first data value,
   (d) wherein the terminal is further configured to transmit an alert in response to determining a specified duration of time has passed between attempting to read the unreadable object and receiving the first data value.

2. The system of claim 1, wherein one of the plurality of portable electronic devices is configured to notify the server if a user of one of the plurality of portable electronic devices has begun searching for the duplicate object.

3. The system of claim 2, wherein the server is further configured to transmit a fourth message to the terminal, the fourth message including a notification that a user of one of the plurality of portable electronic devices has begun searching for the duplicate object.

4. The system of claim 1, wherein the server is further configured to notify a manager if the machine readable feature of the duplicate object is not read after a specified period of time.

5. The system of claim 1, wherein the terminal is further configured to provide a visual indication while the duplicate object is being located and the machine readable feature of the duplicate object is read.

6. The system of claim 5, wherein the terminal is further configured to cease providing the visual indication after the duplicate object has been located and the machine readable feature of the duplicate object is read.

7. The system of claim 1, wherein the terminal is further configured to allow completion of a transaction before the duplicate object has been located and the machine readable feature of the duplicate object is read.

8. A machine reading method comprising:
generating a reference number corresponding to a selection of objects to be read by an optical reader at a terminal;
attempting to read an unreadable object;
generating a temporary object number corresponding to the unreadable object included in the selection of objects, in response to failing to read the unreadable object;
capturing an image of the unreadable object via an image capturing device at the terminal;
transmitting a first message to a server via a first communication channel in response to identifying an unreadable object, the first message including the reference number, the temporary object number, and the image of the unreadable object;
receiving a second message by a plurality of portable electronic devices, including a request to locate a duplicate of the unreadable object based on the captured image and read a machine readable feature of the duplicate object
calling a first service offered by the server to retrieve a first data value corresponding to the duplicate object from a database and associate the first data value with the temporary object number, in response to a first of the plurality of portable electronic devices reading a machine readable feature of the duplicate object;
transmitting a third message from the server to the terminal, the third message including the first data value associated with the temporary object number that invokes a second service offered by the terminal to replace the temporary object number with the first data value;
reading machine readable features of additional objects from the selection of objects, using the optical reader, while the duplicate object is being located and before the machine readable feature of the duplicate object are read; and transmitting an alert in response to determining a specified duration of time has passed between attempting to read the unreadable object and receiving the first data value.

9. The method of claim 8, further comprising:
transmitting a notification from one of the plurality of portable electronic devices in response to an input received at one of the plurality of portable electronic devices, the user input indicating that a user of one of the plurality of portable electronic devices has begun searching for the duplicate object.

10. The method of claim 9, further comprising:
transmitting a fourth message to the terminal, the fourth message including a notification that a user of one of the plurality of portable electronic devices has begun searching for the duplicate object.

11. The method of claim 8, further comprising:
notifying a manager if the machine readable feature of the duplicate object is not read after a specified period of time.

12. The method of claim 8, further comprising:
providing a visual indication at the terminal while the duplicate object is being located and the machine readable feature of the duplicate object is read.

13. The method of claim 12, further comprising:
ceasing to provide the visual indication at the terminal after the duplicate object has been located and the machine readable feature of the duplicate object is read.

14. The method of claim 8, further comprising:
completing a transaction at the terminal before the duplicate object has been located and the machine readable feature of the duplicate object is read.

15. A non-transitory machine-readable medium storing instructions executable by a processing device, wherein execution of the instructions causes the processing device to implement a machine reading method, the method comprising:
generating a reference number corresponding to a selection of objects to be read by an optical reader at a terminal;
generating a temporary object number corresponding to an unreadable object included in the selection of objects, the unreadable object incapable of being read by the optical reader;
capturing an image of the unreadable object via an image capturing device at the terminal;
transmitting a first message to a server via a first communication channel in response to identifying an unreadable object, the first message including the reference number, the temporary object number, and the image of the unreadable object;
receiving a second message by a plurality of portable electronic devices, including a request to locate a duplicate of the unreadable object based on the captured image and read a machine readable feature of the duplicate object;
calling a first service offered by the server to retrieve a first data value corresponding to the duplicate object from a database and associate the first data value with the temporary object number, in response to a first of the plurality of portable electronic devices reading a machine readable feature of the duplicate object;
transmitting a third message from the server to the terminal, the third message including the first data value associated with the temporary object number that invokes a second service offered by the terminal to replace the temporary object number with the first data value;

reading machine readable features of additional objects from the selection of objects, using the optical reader, while the duplicate object is being located and before the machine readable feature of the duplicate object are read; and transmitting an alert in response to determining a specified duration of time has passed between attempting to read the unreadable object and receiving the first data value.

16. The non-transitory machine-readable medium of claim 15, wherein execution of the instructions further causes the processing device to:

transmit a notification from one of the plurality of portable electronic devices in response to a user input received at one of the plurality of portable electronic devices, the user input indicating that a user of one of the plurality of portable electronic devices has begun searching for the duplicate object.

17. The non-transitory machine-readable medium of claim 16, wherein execution of the instructions further causes the processing device to:

transmit a fourth message to the terminal, the fourth message including a notification that a user of one of the plurality of portable electronic devices has begun searching for the duplicate object.

18. The non-transitory machine-readable medium of claim 15, wherein execution of the instructions further causes the processing device to:

notify a manager if the duplicate object is not read after a specified period of time.

19. The non-transitory machine-readable medium of claim 15, wherein execution of the instructions further causes the processing device to:

provide a visual indication at the terminal while the duplicate object is being located and the machine readable feature of the duplicate object has been read.

20. The non-transitory machine-readable medium of claim 19, wherein execution of the instructions further causes the processing device to:

cease providing the visual indication at the terminal after the duplicate object has been located and the machine readable feature of the duplicate object has been read.

21. The non-transitory machine-readable medium of claim 15, wherein execution of the instructions further causes the processing device to:

complete a transaction at the terminal before the duplicate object has been located and the machine readable feature of the duplicate object has been read.

* * * * *